United States Patent Office 3,574,217
Patented Apr. 6, 1971

---

3,574,217
PROCESS FOR SUBSTITUTING AROMATICALLY BOUND HALOGEN BY HYDROGEN
Wilhelm Mack, Olching-Upper Bavaria, Germany, assignor to Consortium fur Elektrochemische Industrie G.m.b.H., Munich, Bavaria, Germany
No Drawing. Filed May 29, 1968, Ser. No. 732,889
Claims priority, application Germany, June 5, 1967, C 42,539
Int. Cl. C07b 1/00
U.S. Cl. 260—293.4                         7 Claims

ABSTRACT OF THE DISCLOSURE

This invention relates to replacing aromatically bound halogen by hydrogen in aromatic polyhalogen compounds, and it has for its object to provide a novel and efficient process for this purpose.

---

In carrying out the process of the invention, aromatic polyhalogen compounds are reacted with tellurides in the presence of compounds which contain replaceable hydrogen atoms.

BACKGROUND OF THE INVENTION

There are several descriptions in the literature of the substitution of halogen by hydrogen in aromatic compounds (Houben-Weyl 5/4 p. 769–775, G. Thieme Verlag, Stuttgart 1960; Advances in Heterocyclic Chemistry, vol. 1, pp. 40–43, Academic Press, New York, London, 1963).

Essentially the reaction with metals like sodium, magnesium, zinc or aluminum or the use of catalytically excited hydrogen, is mentioned. However, with aromatic polyhalogen compounds the reactions are unsatisfactory with respect to selectivity, speed and yields. For eliminating halogen from aromatic polyhalides, heating in methanolic lye is recommeded. Although this reaction gives a good yield of tetrabromo benzene from perbromo benzene, in the case of converting perchloro benzene, however, larger quantities of pentachloro anisole are formed as a by-product. The conversions of periodo thiophene with activated aluminum into a mixture of 3-iodo thiophene and 3,4-di-iodo thiophene and of perchlorothiophene with magnesium into 2,3,4-tricholrothiophene are described (W. Steinkopf, W. Köhler, Liebigs Ann. 532, p. 250), but both show unsatisfactory yields.

SUMMARY OF THE INVENTION

The present invention concerns a process for substituting aromatically bound halogen by hydrogen in aromatic polyhalogen compounds, and it is characterized by the fact that aromatic polyhalogen compounds are transformed with tellurides in the presence of compounds with replaceable hydrogen atoms.

Suitable aromatic polyhalogen compounds are carbo- or heterocyclic, mono- or polynuclear aromatics.

Particularly suitable are aromatic polyhalogen compounds which derive from benzene, naphthalene, thiophene or selenophene and where at the most one substitutable carbon atom of the aromatic cyclic system is not substituted by chlorine, bromine or iodine, but carries one hydrogen atom, one phenoxy group or one piperidene group.

A suitable telluride is particularly sodium telluride because it is easily obtainable; but basically the other alkaline tellurides like ammonium and alkaline earth tellurides are also suitable for the conversion. When using sodium telluride as the reduction agent, and methanol, the reaction will take place formally according to the equation $$Ar\text{-}Hal + Na_2Te + CH_3OH \rightarrow ArH + Te + NaCl + CH_3ONa$$

Suitable compounds which contain replaceable hydrogen atoms are for instance water and alcohols, particularly lower aliphatic alcohols. Preferred are alcohols with 1–3 carbon atoms and 1–2 hydroxyl groups like e.g. methanol, ethanol, propanol or glycol. With the same results, however, one can also use mixtures of the alcohols with each other or with water. Moreover, solvents not participating in the reaction, like for instance benzene or tetrahydrofuran, can also be present.

DESCRIPTION OF THE PREFERRED EMBODIMENTS

Preferably the process is carried out in such a manner that a solution of sodium telluride and the organic halogen compound in alcohol or water is heated until the separation of tellurium is completed. The reaction frequently takes place even at room temperature, but preferably it is speeded up by the use of elevated temperatures. After completion, the reduced compound is isolated, after filtering from the tellurium which as a rule is precipitated in crystalline form, by distilling or extracting with suitable solvents.

For the conversion the preferred temperatures used are room temperatures, i.e. about 20° C., up to 200° C. although temperatures outside this range may be of advantage in special cases. For instance, by heating in the bomb oven or in the autoclave one could use higher temperatures. Preferred are temperatures from 20° to 120° C.

The reduction of the aromatic polyhalogen compounds takes place in steps, in which the reaction speed is decreasing from the perhalogen compounds towards the compounds that are poorer in halogen. Generally the conversion stops after substitution of 1 to 3 halogen atoms. If more severe reaction conditions are used, as for instance higher temperatures, it is possible to reduce more halogen atoms. In this manner one obtains, for instance, by boiling one mol perchlorobenzene with 2 mol sodium telluride in methanol, almost exclusively 1,2,4,5-tetrachlorobenzene. Accordingly, one mol perchlorothiophene with 1 mol sodium telluride is reduced to 3,4,5-trichlorothiophene, and when using 2 mol sodium telluride, to 3,4-dichlorothiophene. No further substitution of the chlorine atoms is possible, However, with perchloro selenophene the halogen substituent in the 4-position can also be reduced.

Conditions are similar with aromatic polyhalogen compounds which still carry other substituents than halogen or hydrogen. For instance, 2-phenoxy-3,4,5-trichloro thiophene is reduced to 2-phenoxy-3,4,-dichloro thiophene, and 2-piperidino-3,4,5-trichloro thiophene to 2-piperidino-3,4-dichloro thiophene.

Another method of carrying out the invention consists of using tellurides which are made in the reaction medium by reduction from elementary tellurium. A suitable reduction agent for this purpose is for instance rongalite (L. Tschugaeff, L. Chopin, Ber. Dtsch. Chem. Ges. 47, 1274; 1914). Since the reducing component of rongalite is sulfoxylate ($SO''_2$), the process of the transformation can be presented as follows:

| $SO''_2 + Te + 2OH'$ | $SO''_3 + Te'' + H_2O$ |
|---|---|
| $Te'' + ArCl + H_2O$ | $Te + ArH + Cl' + OH'$ |
| $SO''_2 + OH' + ArCl$ | $SO''_3 + ArH + Cl'$ |

Accordingly, tellurium has the character of a catalyst and therefore catalytic quantities (0.1% of the stoichiometric quantity) of tellurium are sufficient. It should be pointed out in this connection that the reaction takes place only in the presence of tellurium, because rongalite alone is unable to reduce the halogen compound.

The advance of the process of the present invention is mainly due to the fact that the generally easily accessible perhalogenated aromatic compounds can be converted easily and often quantitatively into the less easily accessible partly halogenated products of a defined constitution. For instance, tetrachlorothiophene (U.S. Patent No. 2,900,394) which can easily be made from hexachlorobutadiene and sulphur, can be transformed by the process of the invention into 3,4,5-trichloro- and 3,4-dichlorothiophene which up to now could be made only with difficulty. Technically the substances produced according to the process of the invention are important intermediate products for the organic chemical industry, moreover these substances are used for plant protection.

Example 1

5 g. hexachlorobenzene were heated with 6.1 g. $Na_2Te$ in 145 ml. methanol for 33 hours under reflux. Then the precipitated tellurium was filtered off and the methanol was distilled off. After pouring the residue into water, it was possible to obtain the reaction product (2.9 g.=67% of theory) by extraction with benzene, and after determining the melting point and the IR spectrum it was identified as 1,2,4,5-tetrachlorobenzene.

Example 2

5.25 g. tetrachlorothiophene were heated with 3.91 g. $Na_2Te$ in 100 ml. methanol for 2 hours under reflux. Then the precipitated tellurium was filtered off and the content of 3,4,5-trichlorothiophene was determined by a gas chromatograph. Besides 5% of unconverted tetrachlorothiophene, 90% of the theoretical yield of 3,4,5-trichlorothiophene were obtained. Only traces of 3,4-dichlorothiophene had formed. Generally the same result was obtained when using $K_2Te$.

Example 3

In a 6-liter flask 330 g. NaOH, 485 g. rongalite, 192 g. tellurium, 333 g. tetrachlorothiophene, 2.1 liters water and 2.1 liters methanol were heated under vigorous stirring in a nitrogen atmosphere for 33 hours under reflux. After 17 hours a sample was analyzed on the gas chromatograph. Besides 13% unchanged tetrachlorothiophene there was 84% trichlorothiophene and 3% dichlorothiophene. After another 8 hours the composition was 10% tetrachlorothiophene, 86% trichlorothiophene and 4% dichlorothiophene. During processing the tellurium was precipitated quantitatively by passing air through for 1 hour, and subsequently the methanol was distilled off. It was possible to obtain a small percentage of tetra- and trichlorothiophene in the methanol distillate by pouring into a three-times larger quantity of water and extracting with benzene. The distillation residue was thinned with 1 liter water and the organic components were taken up in benzene.

Instead of being extracted with benzene, the organic components can also be isolated by water vapor distillation. The separated tellurium was filtered off and further processing was done by fractional distillation. Yield: 208 g. 3,4,5-trichlorothiophene=74% of theory, referred to the tetrachlorothiophene used; 81% of theory referred to the converted tetrachlorothiophene. Boiling point 83° C./12 torr. Furthermore 30 g. tetrachlorothiophene and 186 g. (97%) tellurium were recovered and 5.4 g. 3,4-dichlorothiophene were obtained as a by-product.

Example 4

75 g. trichlorothiophene were heated in a nitrogen atmosphere with 70 g. $Na_2Te$ in 400 ml. methanol for 27 hours under reflux. On the gas chromatograph the composition of the reaction mixture was found to be 85.7% 3,4-dichlorothiophene and 14.2% 3,4,5-trichlorothiophene. The 3,4-dichlorothiophene was isolated by fractional distillation as a light yellow liquid with a boiling point of 60° C./12 torr.

Example 5

14.5 g. 2-phenoxy-3,4,5-trichlorothiophene were heated with 9.8 g. $Na_2Te$ in 80 ml. methanol under a nitrogen atmosphere for 1½ hours to 50° C. Then the tellurium that had formed was filtered off, the filtrate was diluted with water and extracted with cyclohexane. By distilling 12.5 g.=99% of theory 2-phenoxy-3,4-dichlorothiophene with boiling point 92–95° C./0.1 torr was obtained as a colorless liquid. The compound was identified by elementary analysis, IR and NMR spectrum.

Example 6

10.1 g. of 2-piperidino-3,4,5-trichlorothiophene were heated with 7.15 g. $Na_2Te$ in 100 ml. methanol under a nitrogen atmosphere for 39 hours under reflux. The eliminated Te was filtered off, the filtrate was diluted with water and extracted with carbon tetrachloride. By fractionally distilling, the 2-piperidino-3,4-dichlorothiophene that formed was separated as a colorless liquid with boiling point 95° C./0.1 torr. Yield: 7.3 g.=82% of theory. The compound was identified by IR and NMR spectrum.

Example 7

9.2 g. octachloronaphthalene were heated with 4.35 g. $Na_2Te$ in 50 ml. methanol under a nitrogen atmosphere, with stirring, for 10 hours under reflux. The mixture of tellurium and insoluble reduction product was syphoned off and the precipitated tellurium was washed out with benzene. Recrystallization from glacial acetic acid yields yellowish crystals with M.P. 176° C., by elementary analysis and determining the molecular weight, the substance was identified as heptachloronaphthalene.

Example 8

12.6 g. tetrachloroselenophene were brought to react under stirring and in a nitrogen atmosphere for 1½ hours with 8.9 g. $Na_2Te$ and 180 ml. methanol at 35° C. Then the separated Te was filtered off and after the filtrate was poured into water, the organic part was extracted with cyclohexane. The fractional distillation yielded 6.75 g.=63.5% theory, reaction product within a boiling range of 118–124° C./12 torr. The mixture of substances was separated by preparative gas-chromatography and was identified by IR and NMR spectrum. Besides unconverted tetrachloroselenophene, 3,4 - dichloroselenophene and 3-chloroselenophene were also obtained. The structure of the 3-chloroselenophene follows from the position of the NMR signals at 7.65 (H–2); 7.19 (H–4) and 7.86 (H–5) p.p.m. with a coupling constant $I_{(H-4/H-5)}$ of 5.2 cycles. The solvent was $CCl_4$ with TMS as internal standard.

Example 9

5 g. $CaTeO_3$ are converted with $H_2$ at 680° C. into CaTe (G. Brauer, Handbuch der präparativen anorganischen Chemi, F. Enke Verlag, Stuttgart, 1960, p. 831). The CaTe obtained in this manner is compounded with a stoichiometric quantity of tetrachlorothiophene in methanol/water and is heated for 5 hours under reflux. The gas-chromatographic analysis of the reaction mixture shows the formation of 24% of theory of 2,3,4-trichlorothiophene.

Example 10

To a suspension of 6.3 g. $Na_2Te$ in 50 ml. ethanol at room temperature under a nitrogen atmopshere, and with stirring, a solution of 11.6 g. of 2-iodo-3,4,5-trichlorothiophene is introduced. After the vigorous reaction dies down, it is heated for 2 hours under reflux, then the separated Te is filtered off, ⅔ of the ethanol is distilled off and the residue is poured into water. By extraction with benzene and distilling, one obtains 4.7 g.=68% of theory of 2,3,4-trichlorothiophene. The Te residue is washed out with water and Cl′ and J′ is potentiometrically determined in the wash water and in the aqueous phase of the benzene extract. Almost exclusively and quantitatively the iodine was eliminated.

Example 11

8.2 g. 2-bromo-3,4,5-trichlorothiophene (colorless crystals, M.P. 45°–46° C. recrystallized from ethanol) are suspended in 30 ml. methanol and a solution of 5.46 g. $Na_2Te$ in 50 ml. methanol is added in a nitrogen atmosphere under stirring. An exothermal reaction takes place. After processing in Example 10, 4.3 g. of 2,3,4-trichlorothiophene (75% of theory) are obtained. The potentiometric determination of halogenide in the aqueous extracts shows that again almost exclusively only bromine was replaced by hydrogen.

Example 12

28.0 g. of 3,4,5-trichloro-2-(phenoxy-p-sulphonic acid Na)-thiophene and 14.1 g. $Na_2Te$ are dissolved in 120 ml. air-free water and heated for 64 hours under $N_2$ to 95° C. In order to remove the excess $Na_2Te$, $O_2$ is piped in for a short period and then the boiling hot solution is filtered off from the tellurium obtained. During cooling, 24.5 g. (96% of theory) of 3,4-dichloro-2-(phenoxy-p-sulphonic acid Na)-thiophene are crystallized out from the filtrate.

Example 13

1280 g. tetrachlorothiophene are suspended in 2 liters methanol and at boiling heat a solution of 990.4 g. $Na_2Te$ in 5 liters methanol is added during a period of 2 hours under strong stirring. The first exothermal reaction is awaited. After heating under reflux for one hour, the violet solution grows pale. The gas-chromatographic analysis shows the formation of 5.3 mol 2,3,4-trichlorothiophene (93% of theory referred to $Na_2Te$), 0.06 mol 3,4-dichlorothiophene (0.75% of theory referred to $Na_2Te$) besides 0.42 mol unchanged tetrachlorothiophene. Within one hour one adds again 990.4 g. $Na_2Te$ in 5 liters methanol and heats it for another 14 hours. The analysis then shows 3.42 mol 3,4-dichlorothiophene (60% of theory referred to $Na_2Te$) besides 2.34 mol 2,3,4-trichlorothiophene. After another 21 hours heating only 62% of theory referred to $Na_2Te$ of 3,4-dichlorothiophene have formed. Due to the formation of sparingly soluble Na-polyelluride, which affects 2,3,4-trichlorothiophene only very slowly, the reaction comes practically to a stop. If one adds 3 liters air-free water, the polytelluride goes into solution again and the reaction continues. After 15 hours heating, 4.9 mol 3,4-dichlorothiophene (86% of theory referred to $Na_2Te$) and 0.87 mol 2,3,4-trichlorothiophene have formed in the reaction mixture. After another 22 hours heating the gas-chromatographic analysis indicates the formation of 5.1 mol 3,4-dichlorothiophene (89.5% of theory referred to $Na_2Te$) and 0.67 mol 2,3,4-trichlorothiophene. In order to oxidize the residual $Na_2Te$ one pipes $O_2$ into the reaction mixture for a short period and neutralizes with HCl gas. One filters off from NaCl and Te and the double quantity of water is added to the filtrate. Subsequently one extracts with benzene. Fractional distillation yields 740 g. 3,4-dichlorothiophene (85% of theory referred to $Na_2Te$ or 84% of theory referred to the tetrachlorothiophene used) and 135.7 g. 2,3,4-trichlorothiophene (13% of theory referred to the tetrachlorothiophene used). 91% of the $Na_2Te$ used were used altogether as reducing agent. 1,434 g. (99% of theory) of tellurium were regained.

Example 14

238.7 g. tetrabromothiophene are heated with 218 g. $Na_2Te$ in 1 liter methanol and 200 ml. water for 3 hours under reflux. Then the separated Te is filtered off, the filtrate is poured into water and extracted with benzene. The Te is likewise washed with benzene. By distilling the united benzene extracts one obtains 123.8 g. of 3,4-dibromothiophene (92% of theory) with boiling point 95–96° C./12 torr.

Example 15

12.7 g. $Na_2Te$ and 32 g. tetrachlorothiophene are heated in 100 ml. ethylene glycol for 30 minutes under $N_2$ and stirring to 90 up to 100° C. Then this is poured into water and extracted with benzene. The gas-chromatographic analysis of the benzolic extract shows the formation of 55 mmol 2,3,4-trichlorothiophene (75% of theory referred to $Na_2Te$) and 13.5 mmol 3,4-dichlorothiophene (18.4% of theory referred to $Na_2Te$) besides 75 mmol unchanged tetrachlorothiophene.

Example 16

12.0 g. $Na_2Te$ and 30 g. tetrachlorothiophene are heated in 50 ml. isopropanol and 50 ml. water under $N_2$ and stirring for 2 hours, to 80° C. Then this is poured into water and extracted with benzene The gas-chromatographic analysis of the benzolic extract shows the formation of 59.5 mmol of 2,3,4-trichlorothiophene (86% of theory referred to $Na_2Te$) besides 75.5 mmol of unchanged tetrachlorothiophene.

Example 17

3,861 g. $Na_2Te$ are dissolved in 20 liters methanol and heated in a mixing boiler to 40° C. After this 2,475 g. tetrachlorothiophene are added gradually, and then 5 liters water. Under an $N_2$ pressure of 3 atmospheres, with stirring, this is heated to 100° C. After 7 hours the reaction is interrupted. The $Na_2Te$ has been consumed. After neutralizing with HCl gas this is poured into 60 liters water, the 3,4-dichlorothiophene which has formed is extracted with benzene and isolated by fractional distillation. Yield: 85% of theory of 3,4-dichlorothiophene referred to the tetrachlorothiophene used.

The invention claimed is:

1. Process for substituting 1 to 3 atoms of aromatically bound halogen by hydrogen in aromatic polyhalogen compounds, which comprises reacting an aromatic polyhalogen compound with a telluride of an alkaline or alkaline earth metal in the presence of a compound which contains replaceable hydrogen atoms and is selected from the group consisting of water, alcohols and mixtures thereof.

2. Process according to claim 1, in which the aromatic polyhalogen campound employed is derived from a substance selected from the group consisting of benzene, naphthalene, thiophene and selenophene.

3. Process according to claim 1, characterized by the fact that an aromatic polyhalogen compound is used in which at the most one substitutable carbon atom of the aromatic cyclic system is not substituted by chlorine, bromine or iodine, but carries a hydrogen atom, a phenoxy group or a piperidino group.

4. Process according to claim 1, in which the compound with replaceable hydrogen atoms is a lower aliphatic alcohol.

5. Process according to claim 1, in which the compound with replaceable hydrogen atoms is a lower aliphatic alcohol with 1–3 carbon atoms and 1–2 hydroxyl groups.

6. Process according to claim 1, in which the reaction is performed at a temperature of about 20° C. to 200° C.

7. Process according to claim 1, in which the reaction is performed at a temperature of 20° to 120° C.

References Cited

Methoden der Organischen Chemie, Houben-Weyl, vol. 514, p. 769, 1960.

HENRY R. JILES, Primary Examiner

S. D. WINTERS, Assistant Examiner

U.S. Cl. X.R.

260—239, 332.3, 332.5, 650, 690